United States Patent
Clingman

(10) Patent No.: US 11,261,854 B2
(45) Date of Patent: Mar. 1, 2022

(54) APPARATUS AND METHOD OF ROTATIONAL ALIGNMENT OF PERMANENT MAGNET TANDEM MOTORS FOR ELECTRICAL SUBMERSIBLE PUMP

(71) Applicant: Baker Hughes Oilfield Operations LLC, Houston, TX (US)

(72) Inventor: James C. Clingman, Broken Arrow, OK (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 16/728,915

(22) Filed: Dec. 27, 2019

(65) Prior Publication Data

US 2021/0199099 A1 Jul. 1, 2021

(51) Int. Cl.
*F04B 17/03* (2006.01)
*F04B 47/06* (2006.01)
(Continued)

(52) U.S. Cl.
CPC .............. *F04B 17/03* (2013.01); *F04B 47/06* (2013.01); *F04D 13/086* (2013.01); *F04D 13/10* (2013.01); *F04D 29/044* (2013.01); *F04D 29/0405* (2013.01); *F04D 29/054* (2013.01); *H02K 5/132* (2013.01); *H02K 15/03* (2013.01)

(58) Field of Classification Search
CPC ........ F04B 17/03; F04B 47/06; F04D 13/086; F04D 13/10; F04D 29/0405; F04D 29/044; F04D 29/054; H02K 5/132; H02K 15/03
See application file for complete search history.

(56) References Cited

U.S. PATENT DOCUMENTS 2,098,958 A * 11/1937 Ekstromer ............. H02K 5/132
310/112
2,240,569 A * 5/1941 Myers .................... H02K 5/132
310/87
(Continued)

FOREIGN PATENT DOCUMENTS

EP 0853202 A1 7/1998
WO 2017139152 A1 8/2017

OTHER PUBLICATIONS

International Search Report and Written Opinion for PCT Application No. PCT/US2020/065665 dated Mar. 18, 2021.

*Primary Examiner* — Christopher S Bobish
(74) *Attorney, Agent, or Firm* — Bracewell LLP; Keith Derrington

(57) ABSTRACT

An electrical submersible well pump assembly has first and second permanent magnet motors. The first motor drive shaft is connected to a coupling that has internal splines for receiving an externally splined end of the second motor drive shaft. Alignment devices rotationally align magnetic poles of the first drive shaft with the magnetic poles of the second drive shaft prior to securing the housings of the first and second motors together. The alignment devices may be a coupling irregularity in the internal splines that is at a controlled orientation relative to the magnetic poles of the first shaft and a shaft irregularity in the external splines that prevents the second drive shaft from fully engaging the coupling unless the shaft irregularity is in a specified rotational position relative to the coupling irregularity.

7 Claims, 6 Drawing Sheets

(51) Int. Cl.
*F04D 29/044* (2006.01)
*H02K 5/132* (2006.01)
*F04D 13/10* (2006.01)
*F04D 29/04* (2006.01)
*F04D 29/054* (2006.01)
*F04D 13/08* (2006.01)
*H02K 15/03* (2006.01)

(56) References Cited

U.S. PATENT DOCUMENTS

| | | | | |
|---|---|---|---|---|
| 4,240,762 A | * | 12/1980 | Lobanoff | F04D 29/044 403/24 |
| 4,409,504 A | * | 10/1983 | Wilson | E21B 17/003 310/87 |
| 4,500,226 A | * | 2/1985 | Romand-Monnier | H02K 5/132 403/13 |
| 4,578,608 A | * | 3/1986 | Meeh | H02K 5/132 310/112 |
| 4,950,101 A | * | 8/1990 | Artzberger | E01C 19/40 403/359.6 |
| 6,752,560 B2 | * | 6/2004 | Wilson | F04D 29/044 403/1 |
| 6,964,299 B2 | | 11/2005 | Scarsdale | |
| 7,325,601 B2 | * | 2/2008 | Mack | F04D 13/021 166/105 |
| 7,611,338 B2 | * | 11/2009 | Swatek | F04D 13/10 310/59 |
| 8,876,500 B2 | * | 11/2014 | Brown | F04B 17/03 417/423.6 |
| 9,893,578 B2 | * | 2/2018 | Clingman | H02K 1/276 |
| 9,920,773 B2 | * | 3/2018 | Wilson | F04D 13/062 |
| 9,976,602 B2 | * | 5/2018 | Parmeter | F16D 3/185 |
| 10,502,221 B2 | * | 12/2019 | Meyer | F04D 1/00 |
| 10,968,914 B2 | * | 4/2021 | Xiao | F04D 13/086 |
| 2007/0273225 A1 | * | 11/2007 | Head | H02K 3/30 310/87 |
| 2009/0202371 A1 | | 8/2009 | Green | |
| 2012/0152563 A1 | | 6/2012 | Tetzlaff et al. | |
| 2014/0028119 A1 | * | 1/2014 | Sagalovskiiy | H02K 5/132 310/43 |
| 2017/0284178 A1 | * | 10/2017 | Reeves | F04B 47/06 |
| 2018/0045209 A1 | * | 2/2018 | Nowitzki | F04D 1/06 |

\* cited by examiner

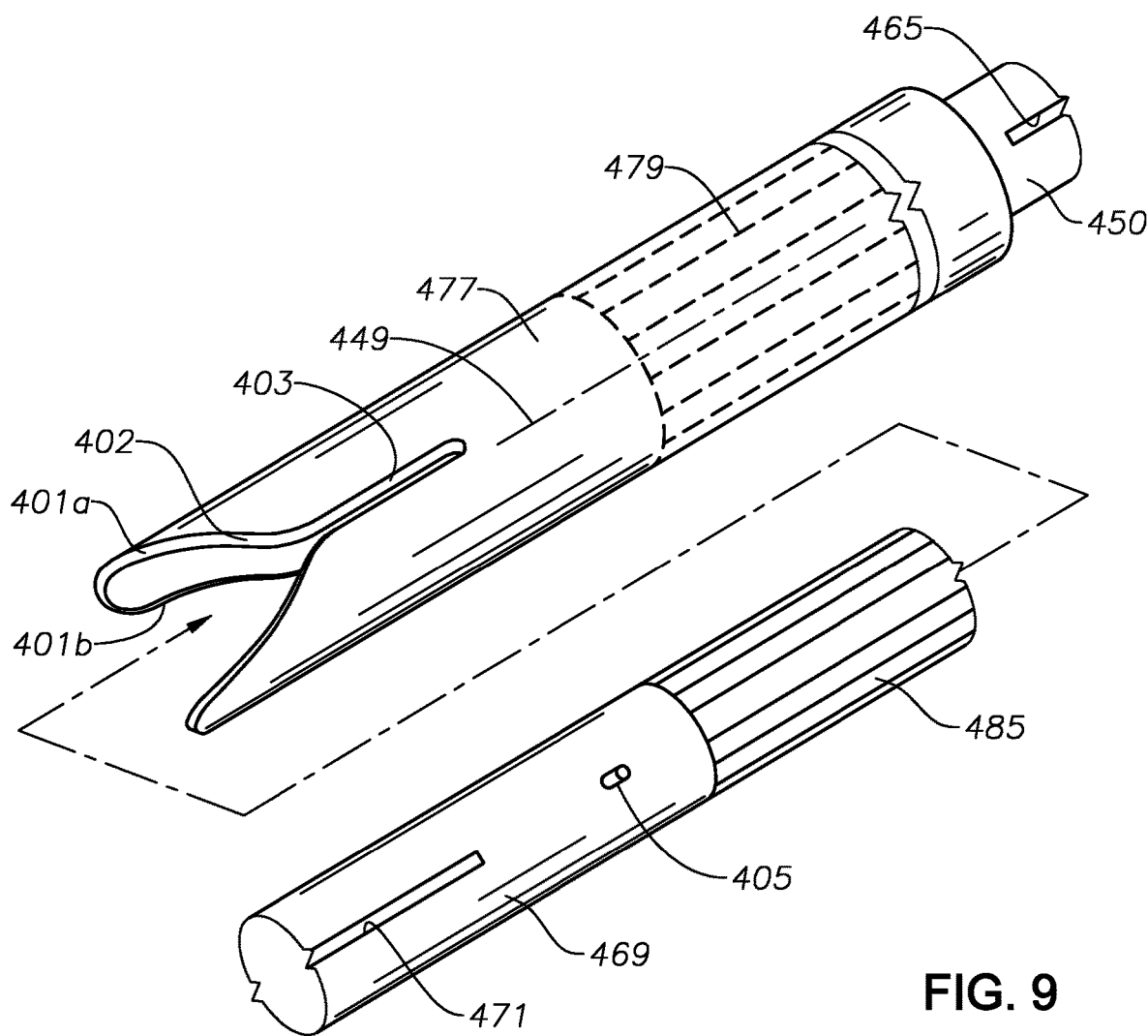
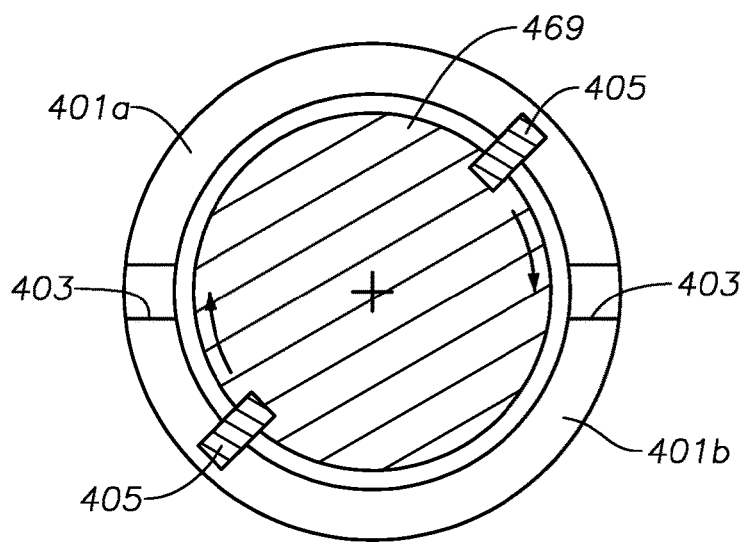

APPARATUS AND METHOD OF ROTATIONAL ALIGNMENT OF PERMANENT MAGNET TANDEM MOTORS FOR ELECTRICAL SUBMERSIBLE PUMP

FIELD OF DISCLOSURE

This disclosure relates to electrical submersible well pumps (ESP), and in particular to permanent magnet tandem ESP motors with the pole magnets in a lower tandem motor axially aligned with the pole magnets in an upper tandem motor.

BACKGROUND

ESP's are often used to pump well fluid from hydrocarbon wells. One common type of motor for an ESP is an induction electric motor having stator windings encircling a rotor mounted to a drive shaft. The rotor is made up of a number of rotor sections spaced apart from each other by motor bearings. Each rotor section has a stack of steel laminations with copper rods extending through them. A key and keyway slot arrangement couples each rotor section to the shaft for rotation. Three-phase power applied to the stator windings induces rotation of the rotor and the shaft.

An ESP induction electric motor may be of a length up to about 30 feet. To increase the overall horsepower, induction electric motors are commonly mounted in tandem. The lower end of an upper tandem motor is electrically connected to the upper end of a lower tandem motor. A power cable leading from the surface of the well to the upper tandem motor sends three-phase alternating current through the windings of the upper tandem motor stator and the windings of the lower tandem motor stator in series. The drive shaft of the upper tandem motor has a lower splined end that connects to the upper splined end of the lower tandem motor with an internally splined coupling.

Another type of ESP motor has permanent magnets in the rotor sections rather than copper rods. Each permanent magnet is typically made up of a stack of individual magnets in a column mounted within a slot in the stack of steel laminations. Each permanent magnet provides one pole of the motor, which may have four or a different number of poles. The key and slot arrangement of each rotor section axially aligns the pole magnets of each rotor section with the pole magnets in the other rotor sections.

Permanent magnet ESP motors have not been operated in tandem. A reason is that for proper operation, the pole magnets of a lower tandem motor would need to be rotationally aligned with the pole magnets of the upper tandem motor. The rotors of ESP motors, whether induction or permanent magnet, are enclosed in a housing and not visible. Being unable to see the rotor sections is not of concern to technicians connecting induction electric ESP motors in tandem because the copper rods in each rotor do not need to be rotationally aligned with each other.

SUMMARY

An electrical submersible well pump assembly has first and second motors, each having a housing. The first and second motors have first and second drive shafts, respectively. Each of the first and second motors have a plurality of rotor sections and a rotor keyway between each of the rotor sections and the shaft of each of the motors, defining magnetic poles. Each of the rotor sections has a plurality of circumferentially spaced permanent magnets. The second drive shaft having a splined end with external splines. A coupling connected with the first drive shaft for rotation in unison has internal splines that engage the external splines for causing the first and second drive shafts to rotate in unison. A housing connector connects the housings of the first and second motors. The connector has a bore with the coupling located therein. Alignment means rotationally aligns the magnetic poles of the first drive shaft with the magnetic poles of the second drive shaft prior to securing the housings of the first and second motors together.

In one embodiment, the alignment means comprises a coupling irregularity in the internal splines that is at a controlled orientation relative to the rotor keyway of the first shaft. A shaft irregularity in the external splines of the second shaft prevents the second drive shaft from fully engaging the coupling unless the shaft irregularity is in a specified rotational position relative to the coupling irregularity. The shaft irregularity is at a controlled orientation relative to the rotor keyway of the second shaft.

In one embodiment, the coupling irregularity comprises an irregularity spacing between two of the internal splines that differs from a uniform spacing between remaining ones of the internal splines. The shaft irregularity comprises an irregularity spacing between two of the external splines that has a same width as the irregularity spacing. Remaining ones of the external splines have a uniform spacing between them.

In a second embodiment, the alignment means comprises a coupling keyway in the coupling that is at a controlled orientation relative to the rotor keyway of the first shaft. A second shaft splined end keyway between the external splines is at a controlled orientation relative to the rotor keyway of the second shaft. A coupling key inserts within the coupling keyway and the second shaft splined end keyway.

In a third embodiment, the alignment means comprises a coupling indicia on an exterior of the coupling that is at a controlled orientation relative to the rotor keyway of the first shaft. A shaft indicia on an exterior of the splined end of the second shaft is at a controlled orientation relative to the rotor keyway of the second shaft.

In a fourth embodiment the alignment means comprises a protuberance on an exterior of the second shaft adjacent the splined end of the second shaft. The protuberance is at a controlled orientation relative to the rotor keyway of the second shaft. An orientation slot on the second end of the coupling has two edges facing each other and curves from a circumferentially wider dimension at an entrance to a guide slot portion. The guide slot portion is at a controlled orientation relative to the rotor keyway of the first shaft. The protuberance has a width for close reception within the guide slot portion. Moving the splined shaft of the second shaft towards the first motor causes the protuberance to enter the orientation slot, which rotates the second shaft until the protuberance enters the guide slot portion.

In the fourth embodiment, the internal splines in the coupling are located axially between the guide slot portion and the first shaft, so that the external splines engage the internal splines only after the protuberance enters the guide slot portion.

In the fourth embodiment, the protuberance may comprise a pair of guide members on an exterior of the second shaft adjacent the splined end of the second shaft and spaced 180 degrees apart from each other relative to an axis of the second shaft, each of the guide members being at a controlled orientation relative to the rotor keyway of the second shaft. The orientation slot comprises a pair of orientation slots on the second end of the coupling, each of the orientation slots having two edges facing each other and curving from a circumferentially wider dimension at an entrance to a linear guide slot portion. The guide slot portion is at a controlled orientation relative to the rotor keyway of the first shaft. Moving the splined shaft end of the second shaft towards the first motor causes the guide members to contact and slide along the edges of the orientation slots, rotating the second shaft until the guide members enter the guide slot portions.

BRIEF DESCRIPTION OF THE DRAWINGS

FIG. 9 is an isometric view of a portion of the shafts of tandem motors and the connecting coupling, and illustrating a fourth technique for rotationally aligning the pole magnets of the motors.

FIG. 10 is a transverse sectional view of the guide members of the lower shaft of FIG. 9 inserted into contact with the orientation slots of the connecting coupling of FIG. 8, but not yet rotated into alignment with the guide slots.

Figures 1, 2:
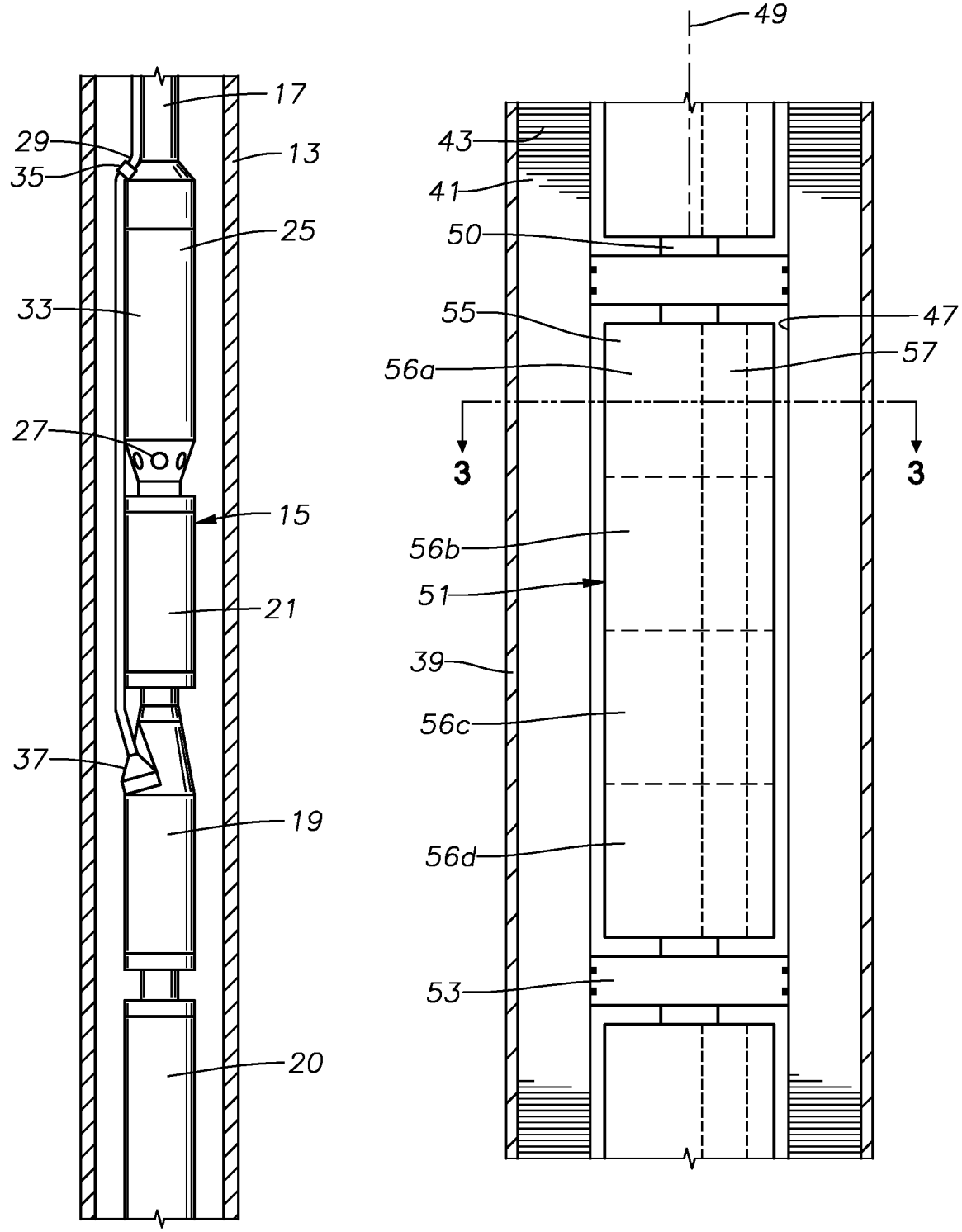
FIG. 1 is an schematic sectional view of an ESP with tandem permanent magnet motors connected in accordance with this disclosure.
FIG. 2 is a schematic, partial axial sectional view of a portion of the upper motor of FIG. 1.

While the disclosure will be described in connection with one embodiment, it will be understood that it is not intended to limit the disclosure to that embodiment. On the contrary, it is intended to cover all alternatives, modifications, and equivalents, as may be included within the scope of the claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, a well has casing 13 that is perforated or has other openings to admit well fluid. An electrical submersible pump assembly or ESP 15 is illustrated as being supported on production tubing 17 extending into the well. Alternately, ESP 15 could be supported by other structure, such as coiled tubing. The terms "upper", "lower" and the like are used herein only for convenience, because ESP 15 can be operated in inclined or horizontal sections of a well. ESP 15 has several modules, including an upper tandem motor 19 and a lower tandem motor 20. Upper motor 19 could be considered to be a first motor and lower motor 20 a second motor, or vice-versa. More than two tandem motors could be employed.

Each motor 19, 20 is a three-phase permanent magnet electrical motor. A motor protector or seal section 21 connects to upper motor 19 and has components, such as a bladder, for reducing a pressure differential between lubricant in motors 19, 20 and the hydrostatic pressure of well fluid on the exterior. The pressure equalizer of seal section 21 may be mounted to an upper end of upper motor 19 or alternately to a lower end of lower motor 20.

A pump 25 connects to seal section 21. Pump 25 has a well fluid intake 27 that will be at the base of pump 25. Pump 25 is normally a rotary pump, such as a centrifugal or progressing cavity pump, but it could be a reciprocating pump. A gas separator (not shown) could be located at the bottom of pump 25, and if so, intake 27 would be in the gas separator. The connections between the modules of ESP 15 are shown as bolted flanges, but they could be threaded connections.

A power cable 29 extends from a wellhead (not shown) alongside tubing 17 for supplying power to motors 19, 20. A motor lead 33, which may be considered to be a lower part of power cable 29, connects to a lower end of power cable 29 by a splice 35 in this example. Motor lead 33 extends alongside ESP 15 and has an electrical connector 37 on its lower end that secures to a receptacle at the upper end of upper motor 19. Splice 35 is illustrated at the upper end of pump 25, but it could be a considerable distance above pump 25.

FIG. 2 illustrates interior portions of upper motor 19, and these portions of lower motor 20 may be identical. Upper motor 19 has a housing 39 containing a non-rotating stator 41. Stator 41 is conventional, having a stack of thin steel discs or laminations 43. Windings 45 (shown in one of the slots in FIG. 3) extend through slots in laminations 43. Stator 41 has a cylindrical central bore 47 with a longitudinal axis 49. A rotatable drive shaft 50 extends through bore 47 on axis 49 for driving pump 25 (FIG. 1).

Rotor sections 51 are mounted to shaft 50 for causing shaft 50 to rotate. Rotor sections 51 are positioned along the length of shaft 50, which may be 30 feet or more, and spaced apart from each other a short distance. Rotor sections 51 may be of various lengths, such as 12 to 18 inches. Radial bearings 53 locate between adjacent ends of the rotor sections 51. Bearings 53 frictionally engage the inner diameter of stator 41 to prevent their rotation.

Each rotor section 51 has a number of permanent pole magnets 55 mounted circumferentially around shaft 50. Pole magnets 55 are indicated by dotted lines in FIG. 2, and may be stacked in segments for each rotor section 51. Each segment has an array of pole magnets 55 spaced around shaft 50. In this example, there are four segments 56a, 56b, 56c and 56d, each segment containing pole magnets 55 encircling shaft 50. The array of four segments 56a, 56b, 56c and 56d extends approximately a full length of each rotor section 51. The lower ends of the pole magnets 55 in each segment 56a, 56b and 56c may abut the upper ends of the pole magnets 55 in the next lower segment. There are at least two pole magnets 55 in each segment 56a, 56b, 56c and 56d, and they are separated from adjacent pole magnets 55 by non-magnetic spacers 57 in this example. The spacers 57 in each segment 56a, 56b, 56c and 56d may have the same axial dimension as the pole magnets 55 in the same segment.

Figure 3:
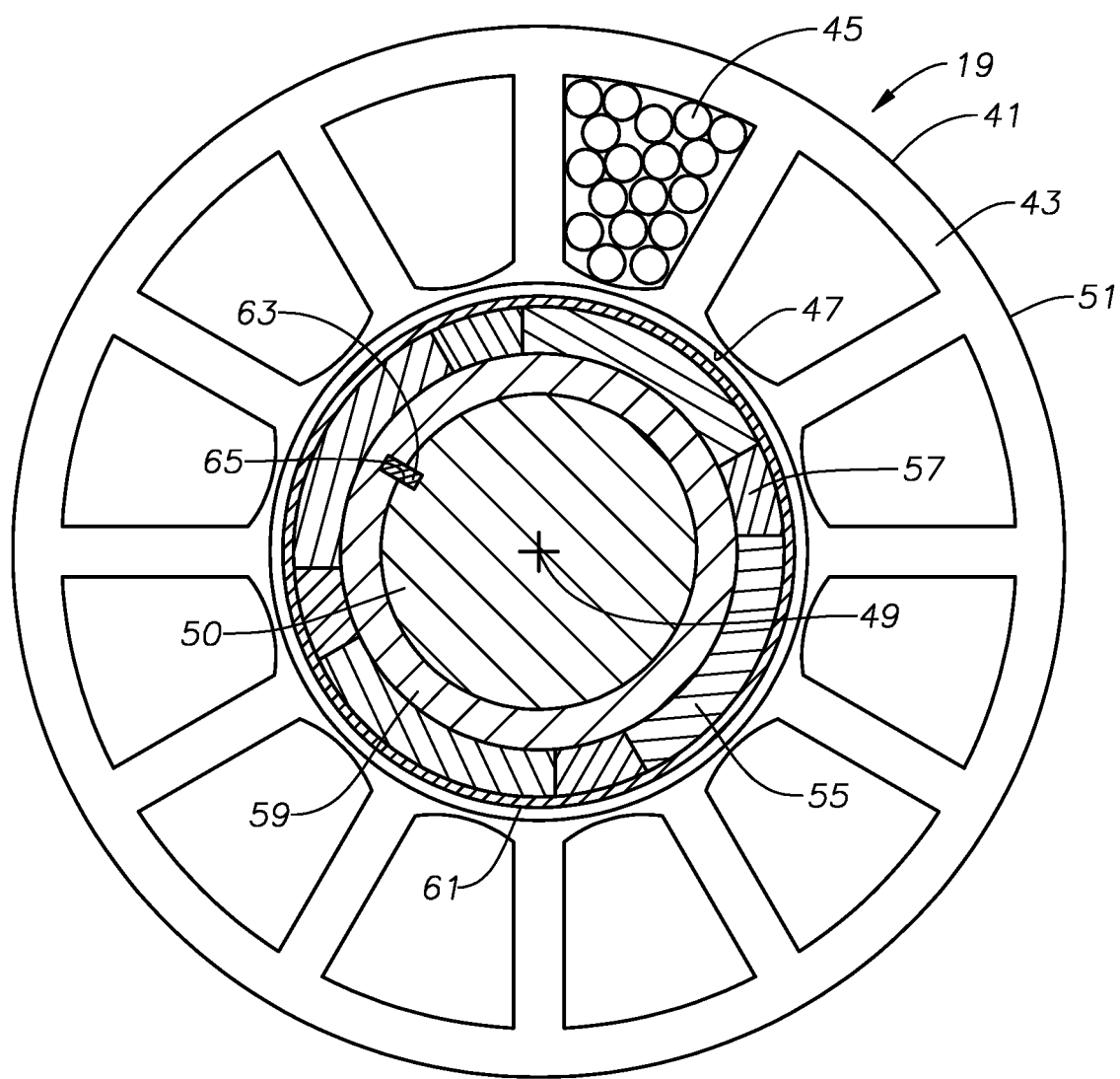
FIG. 3 is a transverse sectional view of the motor of FIG. 2, taken along the line 3-3 of FIG. 2 and with the housing removed.

Referring to FIG. 3, in this example, there are four pole magnets 55 in each segment 56a, 56b, 56c and 56d, but other numbers are feasible, such as two, eight or other numbers. There are also four spacers 57 in each segment 56a, 56b, 56c and 56d, each located between two adjacent pole magnets 55. In this example, pole magnets 55 and spacers 57 are mounted to the outer surface of an inner sleeve 59 that is keyed or affixed to shaft 50 for rotating shaft 50. Pole magnets 55 and spacers 57 may attach to inner sleeve 59 in various manners, such as by epoxy or an adhesive. Optionally, a protective outer sleeve 61 encloses the array of magnets 55, 57 and rotates with each rotor section 51. Shaft 50 and inner sleeve 59 are normally of a magnetically permeable material, such as a steel. Outer sleeve 61 is non-magnetic and may be of different materials. An annular gap exists between outer sleeve 61 and the inner diameter of stator 41.

Each rotor section 51 is secured to shaft 50 for rotating shaft 50, typically by a key 63 engaging a mating slot or keyway 65. The same keyway 65 may extend along shaft 50 through all of the rotors sections 51.

Figure 4:
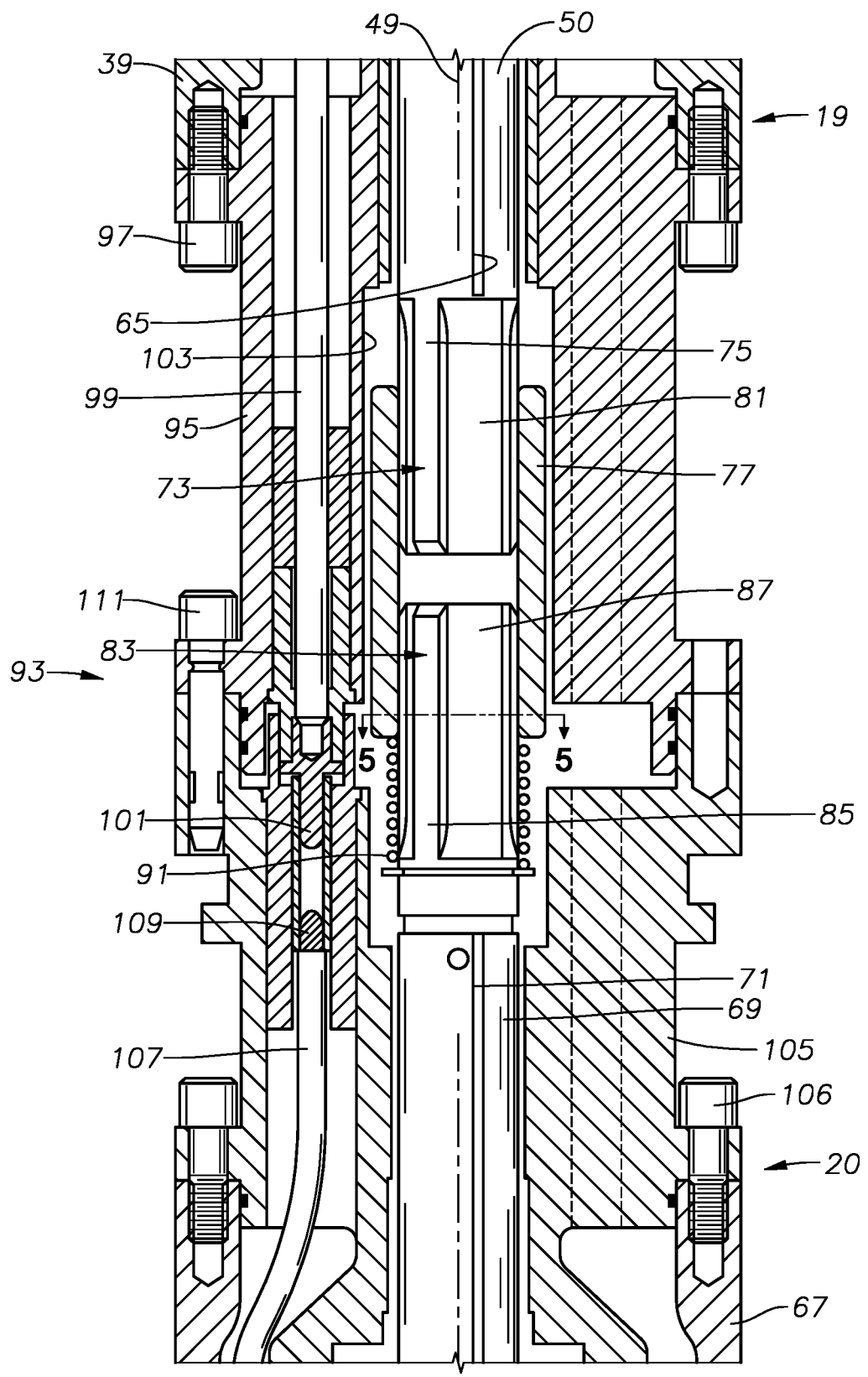
FIG. 4 is an axial sectional view of the connection between the tandem motors of FIG. 1.

Referring to FIG. 4, lower motor 20 has a stator adapter 67 that secures to a motor housing (not shown) and may be considered to be a part of the lower motor housing. A rotatable drive shaft 69 extends through the lower motor housing. Lower motor 20 will have a stator and rotor sections with pole magnets, not shown but the same as upper motor 19. A lower shaft keyway 71 extends along a length of lower shaft 69 for causing rotation of lower shaft 69 by the rotor sections of lower motor 20. In this example, upper shaft 50 has a lower splined end 73 with external splines 75. External splines 75 are spaced around the circumference of lower splined end 73. A tubular coupling 77 has internal splines 79 that slide axially over and mesh with external splines 75.

In this embodiment, the array of external splines 75 has an irregularity 81 formed therein that is at a controlled orientation relative to upper shaft keyway 65 and thus the pole magnets 55 (FIG. 3). The controlled orientation may consist of axially aligning irregularity 81 with keyway 65, as shown. Keyway 65 is at a known orientation relative to pole magnets 55, and in this example, it is on a radial line passing through a center point of one of the pole magnets 55, as shown in FIG. 3.

Coupling 77 has a mating irregularity 82 that will slidingly receive external spline irregularity 81. Irregularities 81, 82 may be a variety of structures that prevent external splines 75 from sliding into engagement with coupling internal splines 79, unless irregularities 81, 82 are axially aligned with each other. In this example, upper shaft irregularity 81 is a space or gap between two external splines 75 where another external spline 75 would normally exist. The spacing between the remaining external splines 75 is uniform and conventional. Coupling internal irregularity 82 is similarly a space or gap where another internal spline 79 would normally exist. The spacing between the remaining internal splines 79 is conventional. The radius from axis 49 to coupling internal irregularity 82 is less than the radius from axis 49 to the tips of external splines 75, thus one of the uniform external splines 75 could not slide into coupling irregularity 82.

Lower shaft 69 has an upper splined end 83 configured the same as upper shaft lower splined end 73 in this example. A lower shaft irregularity 87 also comprises a space or gap between two external splines 85 of lower shaft 69 where another external spline 85 would normally exists. The spacing between the remaining lower shaft external splines 85 is uniform and conventional. The radius from axis 49 to coupling internal irregularity 82 is less than the radius from axis 49 to the tips of lower shaft external splines 85, thus one of the lower shaft external splines 85 could not slide into coupling irregularity 82. Coupling 77 will slide over lower shaft upper splined end 83 only if lower shaft irregularity 87 is axially aligned with coupling irregularity 82.

Coupling internal splines 79 may have a length less than the combined lengths of upper shaft external splines 75 and lower shaft external splines 85. A coil spring 91 may be employed to urge coupling 77 toward a central position, as shown. When coupling 77 is in engagement with both upper shaft splined end 73 and lower shaft splined end 83, upper shaft keyway 65 will be in axial alignment with lower shaft keyway 71. Pole magnets 55 (FIG. 3) will be in the proper alignment with the pole magnets of lower motor 20.

A connector assembly 93 connects upper motor housing 39 (FIG. 2) with the lower motor housing. Connector assembly 93 may be a variety of types, including bolted types, as shown, or threaded rotatable sleeves (not shown). In this example, connector assembly 93 includes an upper motor base 95 which is secured to a stator adapter 98 of upper motor housing 39 with bolts 97. Alternately, upper motor base 95 could have external threads that engage internal threads in upper motor housing 39. Three upper motor wires 99 (only one shown) for the three electrical phases of motors 19, 20 extend downward through passages in upper motor base 95. Each upper motor wire 99 has an electrical connector 101, which is illustrated schematically, on a lower end. Upper motor base 95 has an axial bore 103 in which coupling 77 is located.

Connector assembly 93 also includes a lower motor head 105 that is secured to stator adapter 67 of the lower motor housing with bolts 106. Alternately, lower motor head 105 could have external threads that engage internal threads in lower motor housing stator adapter 67. Lower motor wires 107 (only one shown), one for each phase, have electrical connectors 109 that electrically connect with upper motor electrical connectors 101. Lower motor head 105 secures to upper motor base 95 with bolts 111 in this example.

To connect motors 19, 20, coupling 77 will be positioned over one of the shafts 50, 69, such as upper shaft splined end 73, which requires coupling irregularity 82 to be axially aligned with upper shaft irregularity 81. Lower motor 20 will be positioned in alignment with upper motor 19. Before abutting lower motor head 105 with upper motor base 95, a lower portion of coupling 77 will be visible. Technicians will manually rotate lower motor shaft 69 until lower motor shaft irregularity 87 aligns with coupling irregularity 82. Technicians then slide motors 19, 20 toward each other, which causes lower shaft splined end 83 to slide into engagement with internal splines 79 of coupling 79. The technicians will connect motor wires 75, 107, then abut upper motor base 95 with lower motor head 105 and connect them together with bolts 111.

After running ESP 15 into the well, three phase AC power will be supplied to stator windings 45 and the windings in lower motor 20 via motor wires 99, 107. A variable speed drive at the surface of the well may vary the frequency of the power for startup and other reasons. The current in windings 45 results in magnetic flux being created that revolves around stator 41. The revolving electromagnetic field interacts with the magnetic flux of pole magnets 55, causing rotor sections 51 and upper shaft 50 to rotate. At the same time, the current in the windings of lower motor 20 results in magnetic flux being created that revolves around the stator in lower motor 20, causing its rotor sections and lower shaft 69 to rotate. Because of the connection of upper and lower shafts 50, 69 with coupling 77, the shafts rotate in unison. The coupling irregularity 82 and shaft irregularities 81, 87 assure that the pole magnets 55 of upper motor 19 are aligned with the pole magnets of lower motor 20.

As an alternative, one of the shafts 50, 69 could be permanently secured to coupling 77, as by welding, in a controlled orientation with the pole magnets. For example, coupling 50 could be welded to upper shaft 50 during manufacturing with upper shaft keyway 65 axially aligned with coupling irregularity 82. During connection of lower motor 20 with upper motor 19, lower shaft would be manually rotated to align lower shaft irregularity 87 with coupling irregularity 82 before insertion.

Figure 5:
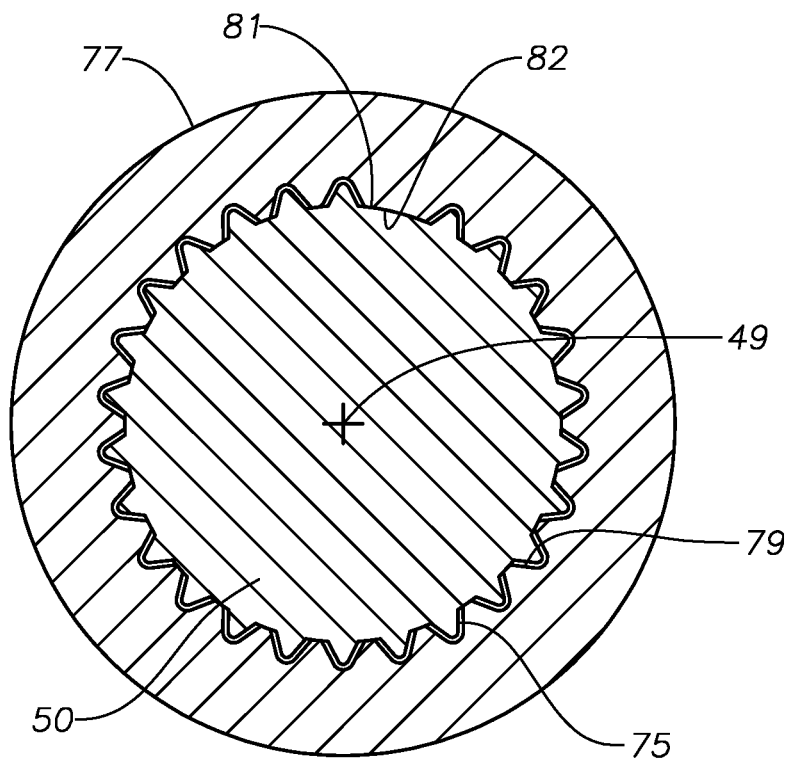
FIG. 5 is a transverse sectional view of the coupling and splined shaft ends of the connection of FIG. 4, taken along the line 5-5 of FIG. 4 and shown removed from the connection, illustrating one technique for rotationally aligning the pole magnets of the motors.
Figure 6:
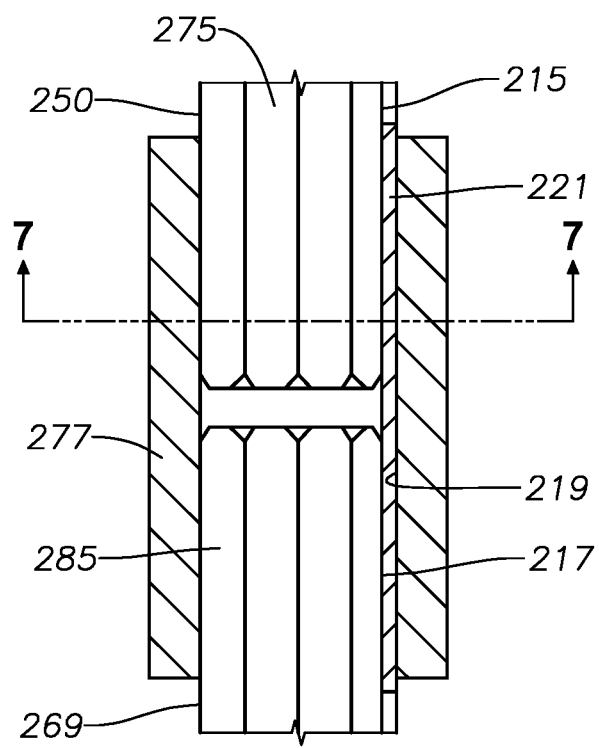
FIG. 6 is a schematic axial sectional view of splined shaft ends and a coupling illustrating a second technique for rotationally aligning the pole magnets of the motors.
Figure 7:
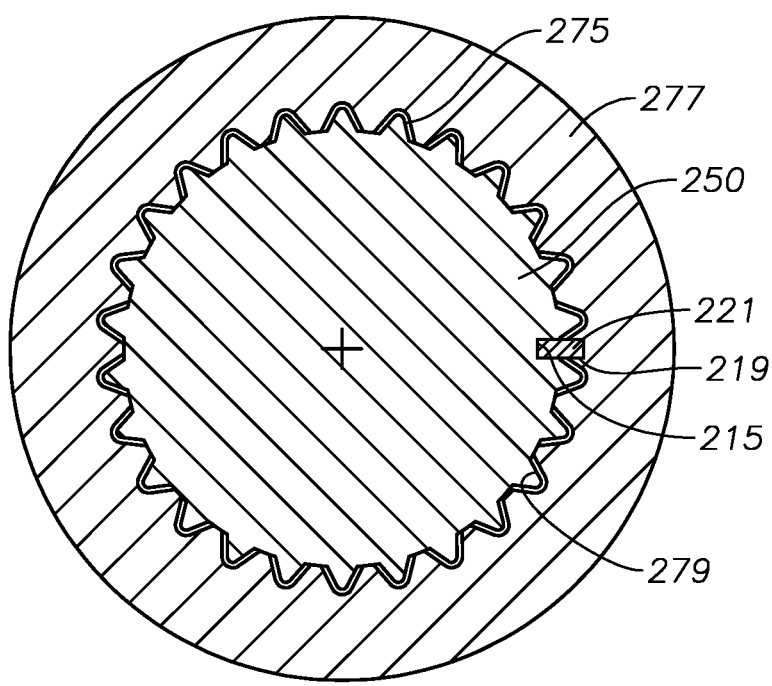
FIG. 7 is a transverse sectional view of the splined shaft ends and coupling of FIG. 6, taken along the line 7-7 of FIG. 6.

FIGS. 6 and 7 illustrates a second embodiment, and components that are the same or similar to those in the first embodiment may have the same reference numerals, except for the prefix of a "2". Upper motor shaft 250 and lower motor shaft 269 have external splines 275, 285 that are uniformly spaced apart without irregularities such as irregularities 81, 87 (FIG. 4). Coupling internal splines 279 are uniformly spaced apart without an irregularity such as irregularity 82 (FIG. 5). An upper shaft spline keyway 215 is formed between two of the upper shaft external splines 275 in a controlled orientation relative to the pole magnets of upper motor 19 (FIG. 4). For example, upper shaft spline keyway 215 may be axially aligned but not joining with upper shaft rotor section keyway 65 (FIG. 4). Upper shaft spline keyway 215 extends through the external splines 275 to the lower end of the splined end of upper shaft 250. Similarly, a lower shaft spline keyway 217 is formed on lower shaft 269 in a controlled orientation relative to the pole magnets of lower motor 20 (FIG. 4). Lower shaft spline keyway 217 may be axially aligned with but not joining the lower shaft rotor section keyway 71 (FIG. 4).

Coupling 277 has a similar coupling keyway 219 that extends substantially the full length of coupling 277. A single coupling key 221 extends through the mating upper shaft spline keyway 215 and coupling keyway 219 and through the mating lower shaft spline keyway 217 and coupling keyway 219. Key 221 and keyways 215, 217 and 219 assure that the pole magnets of upper and lower motors 19, 20 are aligned when connected.

Technicians connecting motors 19, 20 in the technique of the second embodiment will first slide coupling 277 onto one of the shafts, such as upper shaft 250 with upper shaft spline keyway 215 aligned with coupling keyway 219 and key 221 inserted. The technicians manually rotate the other shaft, such as lower shaft 269, until lower shaft spline keyway 217 aligns and receives key 221. Kay 221 may be prevented from axial movement once motors 19, 20 are connected by terminated ends of shaft spline keyways 215, 217.

Alternatively, rather than having a coupling key extending the full length of coupling 277 to engage both shafts 250, 269, one end of coupling 277 could be permanently attached to one of the shafts in a controlled orientation relative to the pole magnets of one of the motors.

Figure 8:
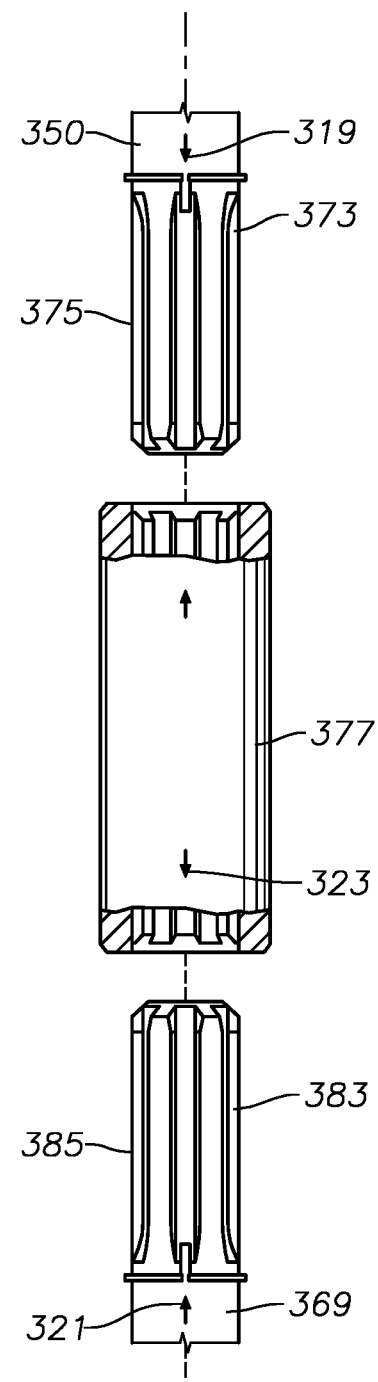
FIG. 8 is an exploded view of the shafts of tandem motors and the connecting coupling, and illustrating a third technique for rotationally aligning the pole magnets of the motors.

FIG. 8 illustrates a third embodiment, with the reference numerals of similar components to the first two embodiments being the same except for the prefix "3". Upper shaft 350 has an indicia 319 formed on it. Indicia 319 could be some type of marking, such as an arrow, or a protuberance. Upper shaft indicia 319 is in a controlled orientation relative to the pole magnets 55 (FIG. 3) of upper shaft 350. For example, it may be on an axial or linear alignment with upper shaft rotor section keyway 65 (FIG. 4). Indicia 319 is illustrated as being adjacent and slightly above upper shaft lower splined end 373, but it could be at other locations, such as on lower splined end 373. Upper shaft external splines 375 may be conventional.

Lower shaft 369 also has an indicia 321 formed on it. Indicia 321 could be some type of marking, such as an arrow, or a protuberance. Lower shaft indicia 321 is in a controlled orientation relative to the pole magnets of lower shaft 369. For example, it may be on an axial or linear alignment with lower shaft rotor section keyway 71 (FIG. 4). Lower shaft Indicia 321 is illustrated as being adjacent and slightly below lower shaft lower splined end 383, but it could be at other locations, such as on lower shaft splined end 383. Lower shaft external splines 385 may be conventional.

Coupling 377 has one or more indicia 323 (two shown) on its exterior and in a position be visible in connector bore 103 (FIG. 3) prior to connecting motors 19, 20. Coupling 377 will be inserted over one shaft end, such as upper shaft splined end 373, with the coupling indicia 323 aligned with upper shaft indicia 319. Once coupling 377 has been inserted over shaft splined end 373, it is possible that upper shaft indicia 319 will no longer be visible in connector bore 103 (FIG. 4). However, at least one of the coupling indicia 323 will be visible. Technicians will rotate lower shaft 369 until lower shaft indicia 321 is in axial or linear alignment with coupling indicia 323, which is already aligned with upper shaft indicia 319. The technicians then push lower shaft splined end 383 into meshing engagement with coupling 377 and secure motor housings 39, 67 (FIG. 4) with connector 93.

Alternatively, rather than having indicia on both shafts 350, 369, one end of coupling 277 could be permanently attached to one of the shafts in a controlled orientation relative to the pole magnets of one of the motors.

FIGS. 9 and 10 illustrate a fourth embodiment, with the reference numerals of similar components to the first three embodiments being the same except for the prefix "4". Coupling 477 has one end, illustrated to be an upper end, permanently connected to upper shaft 450 for rotation in unison. Coupling 477 has two orientation or cam slots 401a, 401b on its lower end. The centers of each orientation slot 401a, 401b are 180 degrees apart from each other. Each orientation slot 401a, 401b has side edges 402 that face each other and curve from a greater width apart at the entrance on the lower end of coupling 477 toward each other.

Side edges 402 of each orientation slot 401a, 401b join a guide slot portion 403 of each orientation slot 401a, 401b, which is linear and extends upward a selected distance. Side edges 402 are parallel to each other and parallel with axis 449 within guide slot portions 403. The guide slot portions 403 of each orientation slot 401a, 401b are 180 degrees apart from each other relative to axis 449. Each guide slot portion 403 is in a controlled orientation relative to one set of pole magnets 55 (FIG. 3) of upper shaft 450. For example, one guide slot portion 403 may be in axial alignment with upper shaft rotor section keyway 465. The other guide slot portion 403 is in alignment with a set of pole magnets 55 that are 180 degrees from the first set. The two orientation slots 401a, 401b provide an appearance of an open mouth of a whale.

Coupling 477 has a set of internal splines 479, shown by dotted lines, but they do not extend to the guide slot portions 403. Internal splines 479 begin adjacent the lower end of upper shaft 450 and extend downward for a length approximately equal to a length of external spline 485 on lower shaft 469.

Lower shaft 469 has two guide members 405 on its exterior below external splines 485. Guide members 405 may comprise pins or other protuberances extending a short distance radially outward from the exterior surface of lower shaft 469. Guide members 405 are 180 degrees apart from each other. Each guide member 405 is in a controlled rotational orientation relative to one set of pole magnets of lower motor 20. For example, one of the guide members 405 may be axially aligned with the lower shaft rotor section keyway 471. Each guide member 405 is sized for close reception within one of the coupling guide slot portions 403. The axial distance from each guide member 405 to the upper end of external splines 485 is less than the axial distance from the lower ends of guide slot portions 403 to internal splines 479.

One guide slot portion 403 is in a controlled rotational position relative to one set of pole magnets 55 (FIG. 3) on upper shaft 450. The other guide slot portion 403 is in a controlled rotational position relative to a set of pole magnets 55 on upper shaft 450 that are 180 degrees from the first set.

When technicians begin moving lower motor 20 (FIG. 4) toward upper motor 19, lower shaft external splines 485 will slide into the open end or entrance of coupling 477. Guide members 405 will likely be initially out of alignment with guide slot portions 403. As a result, they will first contact orientation slot side edges 402 of both orientation slots 401a, 401b, as illustrated in FIG. 10. Continued movement of lower shaft 469 toward upper shaft 450 causes guide members 405 to slide on side edges 402 of each orientation slot 401a, 401b, automatically rotating lower shaft 469 due to the cam action created by orientation slots 401a, 401b. When guide members 405 first enter guide slot portions 403, rotation will stop and lower shaft 469 will be properly oriented relative to upper shaft 450. Lower shaft external splines 485 will be aligned with internal splines 479 but will not yet have engaged internal splines 479. Continued forward movement causes lower shaft external splines 485 to enter and slide into meshing engagement with coupling internal splines 479.

Unlike the first three embodiments, it is not necessary to manually rotate lower shaft 469 to rotationally orient it. The automatic rotational alignment occurring while moving motors 19, 20 toward each other is an advantage because the magnetic fields of the pole magnets in the lower motor 20 can make manual rotation of the lower shaft difficult. Also, as rotation while connecting can generate an electrical charge, the technicians with an automatic alignment system can better position themselves away from any accidental exposure.

The various embodiments illustrate at least four different alignment means for rotationally aligning the magnetic poles of the first drive shaft with the magnetic poles of the second drive shaft prior to securing the housings of the first and second motors together. In the first embodiment (FIGS. 4 and 5), the alignment means comprises irregularities or gaps 81, 87 in external splines 73, 83 of the shafts 50, 69 and an irregularity 82 in the coupling splines 75. In the second embodiment (FIGS. 6 and 7), the alignment means comprises a key 221 extending through keyways 215, 217 on the shafts 250, 269 and a keyway 219 in the coupling 277. In the third embodiment (FIG. 8), the alignment means comprises indicia 319, 321 on shafts 350, 369 and indicia 323 on coupling 377. In the fourth embodiment (FIGS. 9, 10), the alignment means comprises orientation slots 401a, 401b and guide members 405.

The present disclosure described herein, therefore, is well adapted to carry out the objects and attain the ends and advantages mentioned, as well as others inherent therein. While several embodiments of the disclosure have been given for purposes of disclosure, numerous changes exist in the details of procedures for accomplishing the desired results. These and other similar modifications will readily suggest themselves to those skilled in the art, and are intended to be encompassed within the scope of the appended claims.

The invention claimed is:

1. An electrical submersible well pump assembly, comprising:
    first and second motors, each having a housing, the first and second motors having first and second shafts, respectively, each of the first and second motors having a plurality of rotor sections, a rotor keyway between each of the rotor sections and the shaft of each of the motors, each of the rotor sections having a plurality of circumferentially spaced permanent magnets, defining magnetic poles;
    the second shaft having a splined end with external splines;
    a coupling connected with the first shaft for rotation in unison, the coupling having internal splines that engage the external splines for causing the first and second shafts to rotate in unison;
    a housing connector that connects the housing of the first motor with the housing of the second motor, the housing connector having a bore with the coupling located therein; and
    alignment means for rotationally aligning the magnetic poles of the first shaft with the magnetic poles of the second shaft prior to securing the housings of the first and second motors together, the alignment means comprising a coupling keyway in the coupling that is at a controlled orientation relative to the rotor keyway of the first shaft, a second shaft splined end keyway between the external splines is at a controlled orientation relative to the rotor keyway of the second shaft, and a coupling key within the coupling keyway and the second shaft splined end keyway.

2. The assembly according to claim 1, wherein the coupling key prevents full meshing engagement of the first and second shafts with the internal splines unless the keyways of the first and second shaft and the coupling are aligned with each other.

3. An electrical submersible well pump assembly, comprising:
first and second motors, each having a housing, the first and second motors having first and second shafts, respectively, each of the first and second motors having a plurality of rotor sections, each of the rotor sections having a plurality of circumferentially spaced permanent magnets, defining magnetic poles;
the first and second shafts each having a splined end with external splines;
a coupling having internal splines that engage the external splines of the first and second shafts for causing the first and second shafts to rotate in unison;
a housing connector that connects the housing of the first motor with the housing of the second motor, the housing having a bore with the coupling located therein;
a first shaft alignment device on the splined end of the first shaft that is in a controlled orientation relative to the magnetic poles of the rotor sections of the first shaft, the first shaft alignment device comprising an alignment indicia on the first shaft;
a second shaft alignment device on the splined end of the second shaft that is in a controlled orientation relative to the magnetic poles of the rotor sections of the second shaft, the second shaft alignment device comprising an alignment indicia on the second shaft;
a coupling indicia on an exterior of the coupling, enabling an operator to manually rotate one of the shafts relative to the other to align alignment indicia on the first shaft with alignment indicia on the second shaft before engaging the first and second shafts to each other with the coupling.

4. An electrical submersible well pump assembly, comprising:
first and second motors, each having a housing, the first and second motors having first and second shafts, respectively, each of the first and second motors having a plurality of rotor sections, a rotor keyway between each of the rotor sections and the shaft of each of the motors, each of the rotor sections having a plurality of circumferentially spaced permanent magnets, defining magnetic poles;
the second shaft having a splined end with external splines;
a coupling connected with the first shaft for rotation in unison, the coupling having internal splines that engage the external splines for causing the first and second shafts to rotate in unison;
a housing connector that connects the housing of the first motor with the housing of the second motor, the housing connector having a bore with the coupling located therein; and
alignment means for rotationally aligning the magnetic poles of the first shaft with the magnetic poles of the second shaft prior to securing the housings of the first and second motors together, the alignment means comprising,
a protuberance on an exterior of the second shaft adjacent the splined end of the second shaft, the protuberance being at a controlled orientation relative to the rotor keyway of the second shaft,
an orientation slot on an second end of the coupling, the orientation slot having two edges facing each other and curving from a circumferentially wider dimension at an entrance to a guide slot portion, the guide slot portion being at a controlled orientation relative to the rotor keyway of the first shaft, and
wherein moving the splined shaft of the second shaft towards the first motor causes the protuberance to enter the orientation slot, which rotates the second shaft until the protuberance enters the guide slot portion.

5. The assembly according to claim 4, wherein the two edges are parallel within the guide slot portion.

6. The assembly according to claim 4, wherein the guide slot portion comprises a first guide slot portion, the alignment means comprising a second guide slot portion that is disposed 180 degrees from the first guide slot portion.

7. The assembly according to claim 4, wherein the internal splines in the coupling are located axially between the guide slot portion and the first shaft, so that the external splines engage the internal splines only after the protuberance enters the guide slot portion.

\* \* \* \* \*